United States Patent Office 3,311,671
Patented Mar. 28, 1967

3,311,671
METHOD FOR THE SEPARATION OF DIOLEFINS FROM MONOOLEFINS WITH MOLECULAR SIEVES
Bertsil Burgess Baker, West Chester, Pa., assignor to E. I. du Pont de Nemours and Company, Wilmington, Del., a corporation of Delaware
No Drawing. Filed Dec. 30, 1963, Ser. No. 334,578
4 Claims. (Cl. 260—677)

This invention relates to a novel method for the purification of monoolefins and more particularly to the removal of diolefin impurities from monoolefins.

Monoolefins which are sold as articles of commerce are generally obtained in the refining of petroleum as fractions from the various cracking and refining operations. As such they tend to contain impurities of hydrocarbons of similar molecular weight and structure. While such compounds are generally acceptable for most chemical purposes, in certain applications such as the copolymerization of ethylene with higher 1-olefins, it is highly desirable that the content of diolefins be kept to a very low value. In polymerization reactions, such diolefins provide means to crosslink the resin leading to intractable gel material and profoundly modifying the molecular weight distribution even in concentrations as little as 1%.

It is accordingly an object of the present invention to provide a method for separating diolefins from monoolefins.

It is another object of this invention to provide a method for recovering small amounts of diolefin impurities from monoolefins.

It is yet another object of this invention to provide a method for separating diolefins from monoolefins without the consumption of costly chemicals.

These and other objects of this invention which will become apparent hereinafter are achieved by a process which comprises the steps of (a) contacting a liquid mixture of diolefins and monoolefins having from 4 to 30 carbon atoms with a molecular sieve consisting essentially of a zeolite having a pore size of from 10 to 13 A., at a temperature in the range between ambient temperatures and about 100° C.;

(b) thereafter separating a liquid phase in which the diolefin content has been reduced, and a solid phase containing absorbed diolefins;

In a preferred embodiment of the invention, the zeolite is recovered by the following additional steps.

(c) heating the solid phase to a temperature in the range between 150° and 300° C.; and (d) recovering therefrom a regenerated molecular sieve suitable for use in step (a).

The molecular sieves suitable for use in the practice of this invention are alkali metal-aluminum silicates or zeolites which are sold under the trade name of "Linde Molecular Sieves" types 10X and 13X, and are characterized by a void volume of about 50% by volume consisting of mutually connected intra-crystalline voids accessible through pores which will admit molecules with critical dimensions up to 10 and 13 A., respectively, and having an internal surface area of from 700 to 800 square meters/gram and an external surface area of 1 to 3 square meters per gram.

The diolefins which are selectively absorbed by the above molecular sieves may be conjugated or non-conjugated diolefins and include branched diolefins having alkyl side chains.

The monoolefins likewise embrace alkyl side chain isomers.

The temperature at which the separation is performed is not highly critical, but is generally preferred to be below about 50° C. In the case of higher olefins, it is necessary to exceed temperatures of 50° C. in order to obtain the compounds in a suitable liquid state. Separation can be effected up to 100° C., but at temperatures substantially exceeding 100° C. the diolefins tend to be removed.

The molecular sieves readily absorb water and accordingly the separation of this invention should be performed substantially under anhydrous conditions.

This invention is further illustrated by the following example which should not, however, be construed as fully delineating the scope of this discovery.

*Example 1*

A 1 inch diameter glass column was filled to a height of 10½ inches with 60 grams of 1/16 diameter pellets of Linde Molecular Sieve type 13X. The column was washed with 200 ml. of cyclohexane, then a 2.5% by weight solution of 1,7-octadiene in 1-octene was added at a rate of 7 ml./minute. Samples were removed every five minutes and analyzed by gas chromatography. The results obtained are shown in Table I.

TABLE I.—REMOVAL OF 1,7 OCTADIENE FROM 1-OCTENE ON 13 ANGSTROM MOLECULAR SIEVE

| Grams feed/100 grams sieve: | Percent removal of diene |
|---|---|
| 38 | 73 |
| 124 | 48 |
| 320 | 23 |
| 468 | 7 |

The column was then flushed with cyclohexane and air passed over it at ambient temperatures until the surface of the pellets was dry. The column was then flushed with nitrogen and heated to 170° C. for one hour to remove the diene concentrate. The run then repeated with the results shown in Table II.

TABLE II.—REMOVAL OF 1,7 OCTADIENE FROM 1-OCTENE USING A 13 ANGSTROM MOLECULAR SEIVE REGENERATED AT 170° C.

| Grams feed/100 grams sieve: | Percent removal of diene |
|---|---|
| 68 | 56 |
| 196 | 20 |
| 440 | 3 |

The sieve was again regenerated as described hereinabove except that a temperature of 275° C. was employed. The column was again treated with the 2.5% solution of 1,7-octadiene in 1-octene. The results obtained are set forth in Table III.

TABLE III.—REMOVAL OF 1,7 OCTADIENE FROM 1-OCTENE USING A 13 ANGSTROM MOLECULAR SIEVE REGENERATED AT 275° C.

| Grams feed/100 gram sieve: | Percent removal of diene |
|---|---|
| 70 | 67 |
| 132 | 48 |
| 232 | 23 |
| 460 | 8 |

*Example II*

A 1 inch glass column was filled to the height of 46 inches with 1/16 inch pellets of Linde Molecular Sieve type 13X. A crude cut of $C_7$ to $C_9$ 1-olefins containing diene impurities was passed down the column at a rate of 19 ml./minute. The sample was examined before and after the treatment by gas chromatography. The results are given in Table IV. The assignments in the second column of the table were made from the boiling point vs. log retention time relationship for the gas chromatographic column, established with known compounds.

The 1.2 and 4.8 percent loadings in the last two columns are calculated as the total weight of the five dienes fed per 100 g. molecular sieve.

TABLE IV.—RESULTS OF TREATMENT OF COMMERCIAL $C_7$-$C_9$ ALPHA-OLEFIN WITH 13 ANGSTROM MOLECULAR SIEVE

| Relative G. C. Retention Time | Assignment | Amount Present in Feed (Percent) | Percent Removed at Total Diene Loadings of— | |
|---|---|---|---|---|
| | | | 1.2 Percent | 4.8 Percent |
| 11.4 | 1-hexene | 0.2 | | |
| 20.5 | Branched $C_7$ | 0.1 | | |
| 21.8 | do | 0.1 | | |
| 23.4 | 1,6-heptadiene | 0.1 | *n.m | 60 |
| 27.0 | 1-heptene | 26 | | |
| 28.8 | | 0.1 | | |
| 30.5 | Trans 2-heptene | 0.7 | | |
| 32.1 | Cis 2-heptene | 0.2 | | |
| 34.2 | 1,3-heptadiene | 0.1 | 50 | 50 |
| 37.4 | Branched $C_8$ | 0.2 | | |
| 41.3 | do | 0.2 | | |
| 44.6 | do | 0.6 | | |
| 47.6 | do | 0.6 | | |
| 50.0 | do | 0.4 | | |
| 52.2 | 2-methyl-1,6-heptadiene | 0.2 | 100 | 100 |
| 54.2 | 1,7-octadiene | 1.5 | 85 | 40 |
| 57.5 | | 1.5 | | |
| 63.5 | 1-octene | 39 | | |
| 70.7 | Trans-2-octene and/or octane | 0.8 | | |
| 73.6 | Cis-2-octene | 0.5 | | |
| 86.2 | Branched $C_9$ | 0.5 | | |
| 93.2 | do | 0.4 | | |
| 104 | do | 0.4 | | |
| 111 | do | 0.6 | | |
| 124 | 1,8-nonadiene | 1.8 | 65 | 15 |
| 133 | | 0.7 | | |
| 145 | 1-nonene | 19 | | |
| 145 | Cpds. boiling above 1-nonene | 3 (est.) | | |

*n.m.=not measured.

Example III

In order to determine the effect of pore size on the removal of diolefins from monoolefins, four, 20-gram batches of differing zeolite molecular sieves were placed in four flasks and to each was added 20 ml. of a solution containing 5% by weight of 1,7-octadiene in 1-octene. The flasks were permitted to stand about 10 minutes, then the contents of each were analyzed by gas chromatography. In the case of the flasks containing molecular sieves having pore sizes of 4 and 5 A., respectively, no decrease in the diene content was noted. In the case of the flasks containing 10 and 13 micron molecular sieves, the diene content was decreased from 5 to about 1.5% in each case.

Many other modifications of this invention will be apparent to those skilled in the art.

I claim:
1. The method of separating diolefins from monoolefins which comprises the steps of
  (a) contacting a liquid mixture of diolefins and monoolefins, said olefins having from 4 to 30 carbon atoms with a molecular sieve consisting of an alkali metal- or alkaline earth metal-aluminum silicate zeolite having a pore size of from 10 to 13 A., at a temperature in the range between ambient temperature and 100° C. and
  (b) thereafter separating a liquid phase consisting essentially of the said monoolefins with a reduced content of diolefins from the molecular sieve.

2. The method of claim 1 wherein the said liquid mixture comprises a crude cut of monoolefins having from seven to nine carbon atoms.

3. The method of claim 1 additionally comprising the steps of heating the molecular sieve obtained in step (b) to a temperature in the range between 150° C. and 300° C. for a time sufficient to remove the absorbed material therefrom and recovering a regenerated molecular sieve suitable for use in step (a).

4. The method of claim 2 wherein the said liquid mixture comprises a crude cut of monoolefins having from seven to nine carbon atoms.

References Cited by the Examiner

UNITED STATES PATENTS

| | | | |
|---|---|---|---|
| 2,950,336 | 8/1960 | Kimberlin et al. | 260—677 |
| 2,971,993 | 2/1961 | Kimberlin et al. | 260—677 |
| 3,098,814 | 7/1963 | Epperly | 260—677 |
| 3,221,073 | 11/1965 | Davis et al. | 260—677 |

ALPHONSO D. SULLIVAN, *Primary Examiner.*